(12) United States Patent  
Moore et al.

(10) Patent No.: US 8,103,949 B2
(45) Date of Patent: Jan. 24, 2012

(54) TOOLS TO FACILITATE ACCESS TO CROSS-REFERENCED MEDIA

(75) Inventors: Lee Coy Moore, Penfield, NY (US); Dale Ellen Gaucas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 939 days.

(21) Appl. No.: 11/513,619

(22) Filed: Aug. 31, 2006

(65) Prior Publication Data

US 2008/0055665 A1  Mar. 6, 2008

(51) Int. Cl.
*G06F 17/27* (2006.01)
(52) U.S. Cl. ...................................... 715/202
(58) Field of Classification Search .............. 715/202
See application file for complete search history.

(56) References Cited

U.S. PATENT DOCUMENTS

| 6,493,692 B1 * | 12/2002 | Kobayashi et al. ............ 706/46 |
| 7,552,381 B2 * | 6/2009 | Barrus ........................... 715/201 |
| 2002/0194260 A1 * | 12/2002 | Headley et al. ............... 709/203 |
| 2005/0028093 A1 * | 2/2005 | Michel et al. ................. 715/526 |
| 2007/0094304 A1 * | 4/2007 | Horner et al. .............. 707/104.1 |

OTHER PUBLICATIONS

Buyukkokten, et al; Text Summarization of Web pages on Handheld Devices; Digital Libraries Lab (InfoLab), Stanford University; http://www-db.stanford.edu/~orkut/papers/autosumm.pdf; (dated before Mar. 2006).

* cited by examiner

*Primary Examiner* — Laurie Ries
*Assistant Examiner* — Tionna Smith
(74) *Attorney, Agent, or Firm* — Miele Law Group PC

(57) ABSTRACT

Apparatus are provided which include a media content presenter, a media content cross-reference scanner, and a media content cross-reference presentation generator. The media content presenter presents media content. The media content cross-reference scanner scans media content presented by the media content presenter to gather, from the media content, cross-reference identifiers referencing other media content. The media content cross-reference presentation generator generates a set of presentation fields representing the gathered cross-reference identifiers.

21 Claims, 4 Drawing Sheets

TOOLS TO FACILITATE ACCESS TO CROSS-REFERENCED MEDIA

FIELD OF THE DISCLOSURE

Aspects of the present disclosure relate to printing, viewing, or playing back various types of media content, and facilitating easy access to media cross-referenced within a given work.

DESCRIPTION OF BACKGROUND INFORMATION

Various computer applications allow users to access or modify different types of media content, including textual, visual, video, audio, and other works. When printing, viewing, or playing a particular work, that work may refer to another work. For example, a document may have within its content citations, or location identifiers, identifying other documents or other media. A website may also include citations to other webpages, documents, or media, and links to other webpages and media, including, for example, uniform resource locator (URL) links. When a given media content is printed, viewed or played, should the user wish to retrieve a work that is cross-referenced within the given media content, the user must manually go and retrieve that other work.

SUMMARY OF THE DISCLOSURE

Apparatus, a method, or computer readable media encoded with data may be provided, whereby media content is presented to a user, media content is scanned to gather, from the media content, cross-reference identifiers referencing other media content, and a set of presentation fields is generated representing the gathered cross-reference identifiers.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Figure 1:
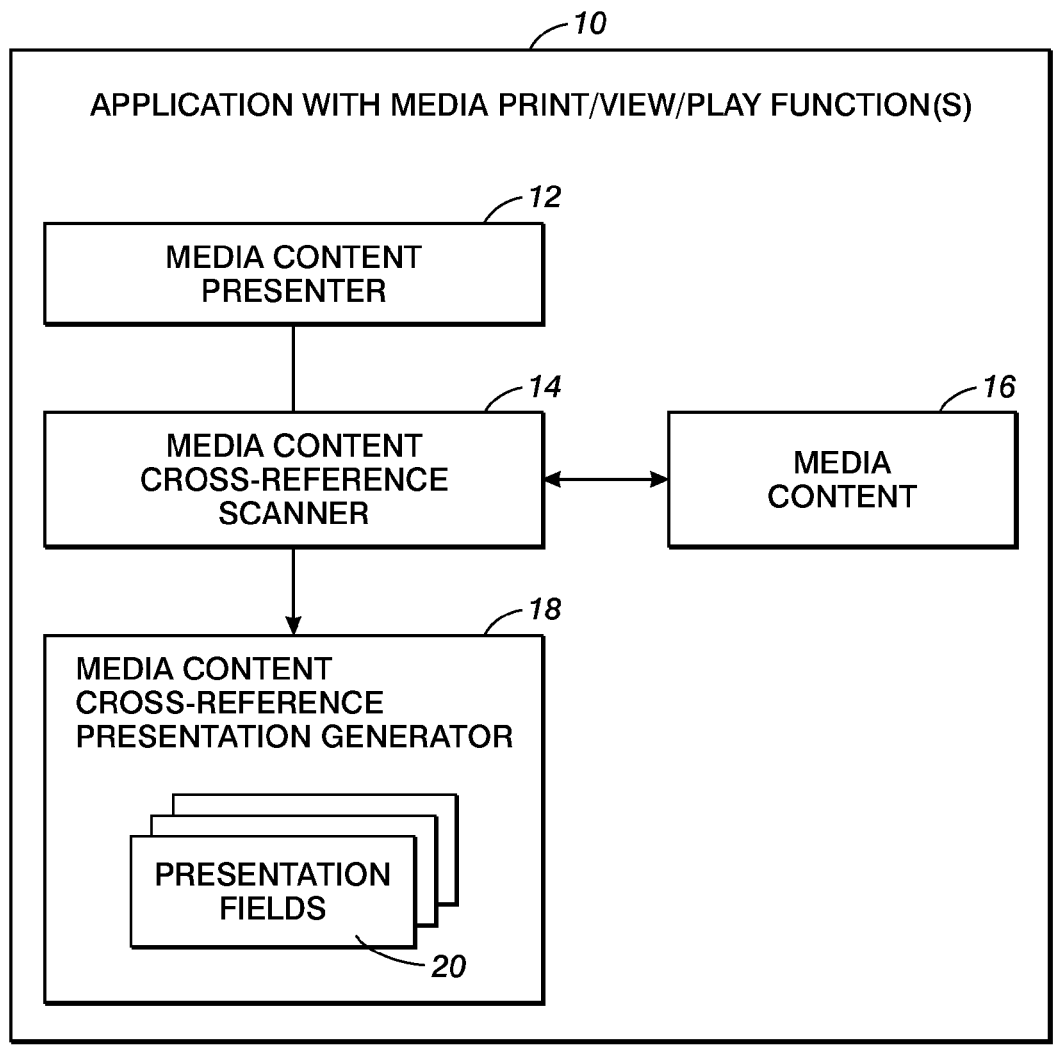
FIG. 1 is a block diagram of an application with media content print, view, and/or play functions.

Referring now to the drawings in greater detail, FIG. 1 is a block diagram of a computer system having an application with media content print, view, and/or play functions. The application may, for example, be a document processor (for example a word processor), graphics or multimedia software, a document repository, or an access point (e.g., a web browser). The illustrated application 10 includes a media content presenter 12, a media content cross-reference scanner 14, media content 16, and a generator 18 to generate a set of media content cross-reference information, including presentation fields 20. The media content presenter 12 may include a print mechanism, a viewer for viewing information on a computer screen, and/or a playback mechanism, for example, to play back audio, audio visual, or video information. The media content presenter 12 may be provided in a computer. Media content cross-reference scanner 14 scans media content to be presented by the media content presenter 12 to gather, from the media content, cross-reference identifiers referencing other media content. The media content may include a given digital work. For example, the given digital work may be a document to be printed. The file may be in a page descriptive language file, for example, PostScript or PDF (portable document format).

The cross-reference identifiers may include citations within a document, location identifiers that identify other media content, or active links to such other media content. The cross-reference identifiers may further include uniform resource locators (URLs). Media content cross-reference scanner 14 may be provided in a digital front end (DFE) (e.g., EFI, or Creo-Kodak), and may read text strings in a PDL file and harvest any URLs therefrom.

The illustrated media content cross-reference presentation generator 18 may be further provided with a mechanism to generate printable presentation fields 20 printable in a paper user interface. The generator may further generate computer screen viewable presentation fields 20. The presentation fields 20, when printed or viewable, may present the gathered cross-referenced identifiers along with retrieval request inputs to allow a user to interact with a given retrieval request input to thereby request retrieval of media content identified by the cross-reference identifier corresponding to the given retrieval request input. The retrieval request inputs may include checked boxes in a PaperWare user interface.

Figure 2:
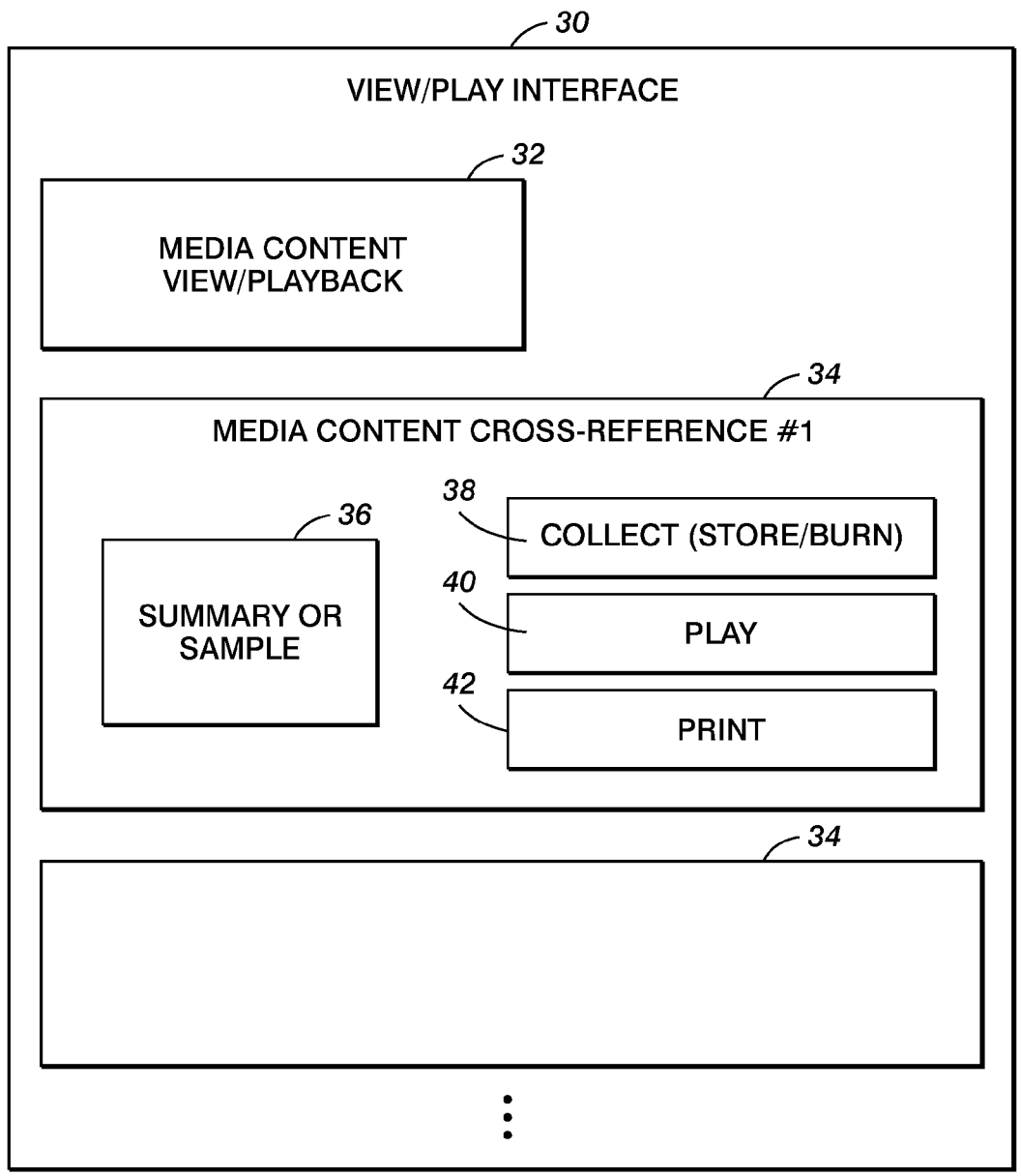
FIG. 2 is a block diagram of a view/play interface.

FIG. 2 shows a view or play back interface 30 of the computer system. The illustrated interface 30 includes a media content view or playback mechanism 32, and a number of media content cross-reference presentation fields 34. Each such presentation field 34, as illustrated in the embodiment shown in FIG. 2, includes a summary or sample 36 of a given media content cross-referenced item (e.g., media content cross-reference #1). In addition, each such presentation field 34 may include buttons or inputs that allow a user to choose a different manner in which the cross-referenced media can be retrieved. Those buttons or inputs may include a collect (store/burn) button 38, a play button 40, and a print button 42. The collect button 38 may cause the storage of the retrieved media, for example, in a hard drive or in a database. In addition, or alternatively, the collect button 38 may allow the user to further select the manner in which the information is collected and stored, for example, by burning a CD. The play button 40 allows the user to select a playback of the selected cross-referenced media content. The print button 42 allows the user to select the retrieval of the cross-referenced media content by printing the same.

Figure 3:
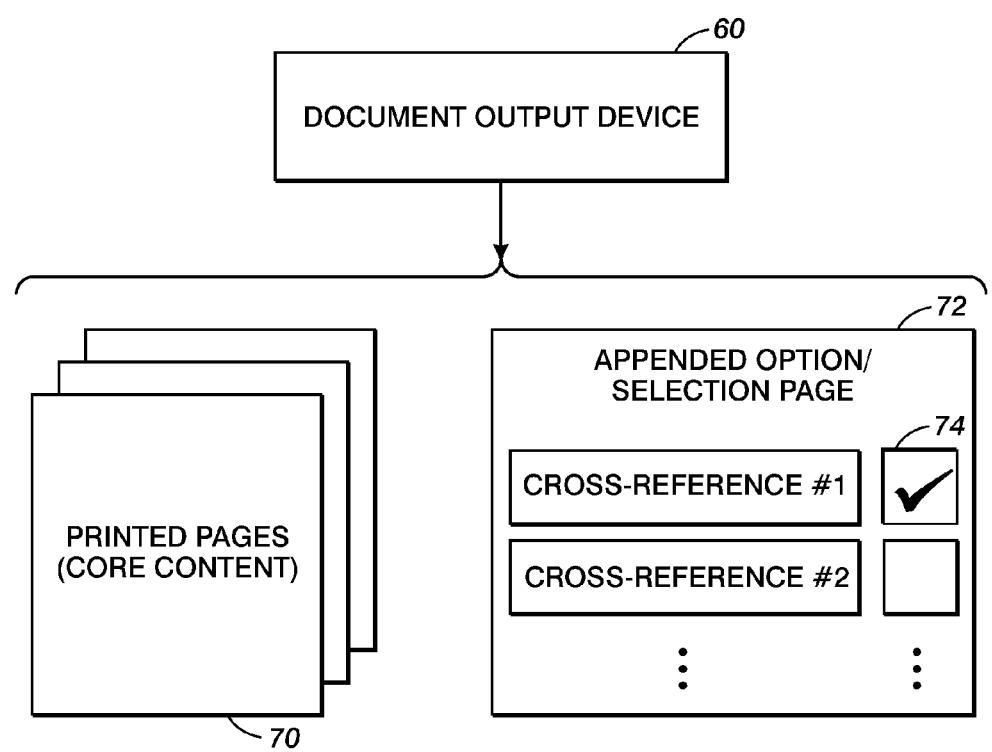
FIG. 3 is a block diagram of a document output device and documents output thereby.

FIG. 3 illustrates a given document output device 60, which may be provided as part of a computer system, or a document system, for example, a printer, or a multi-function device. The document output device 60 may cause printing of printed pages 70, which include the core content of the media content being selected for printing by the user. A corresponding set of appended option/selection pages 72 may also be printed along with the core content printed pages 70. One or more appended pages 72 may be provided with printed matter identifying each of the media content cross-reference identifiers obtained by the media content cross-referenced scanner 14 as shown in FIG. 1. Next to each such identifier, a check box 74 may be provided, which can be checked by the user to indicate a desire for the identified cross-referenced media content to be retrieved. This may be done by checking the box next to a given media content cross-reference item in the appended option/selection page 72, and walking over to a multi-function device and scanning the PaperWare the user interface form 72 into a system, for example, FlowPort. A FlowPort server may be provided which reads the paper with the checked boxes, and causes the retrieval of the requested documents identified by the media content cross-reference identifiers corresponding to those checked boxes. The retrieved documents may be then sent to the same printer to print their core content.

The presentation generator 18 shown in FIG. 1 may be further provided with a summary extraction mechanism to access data-regarding a given media content referred to by the cross-reference identifiers and to extract a summary or a sample of the given media content. That summary or sample may be viewed or played back (or even printed), for example, as shown in FIG. 2.

Figure 4:
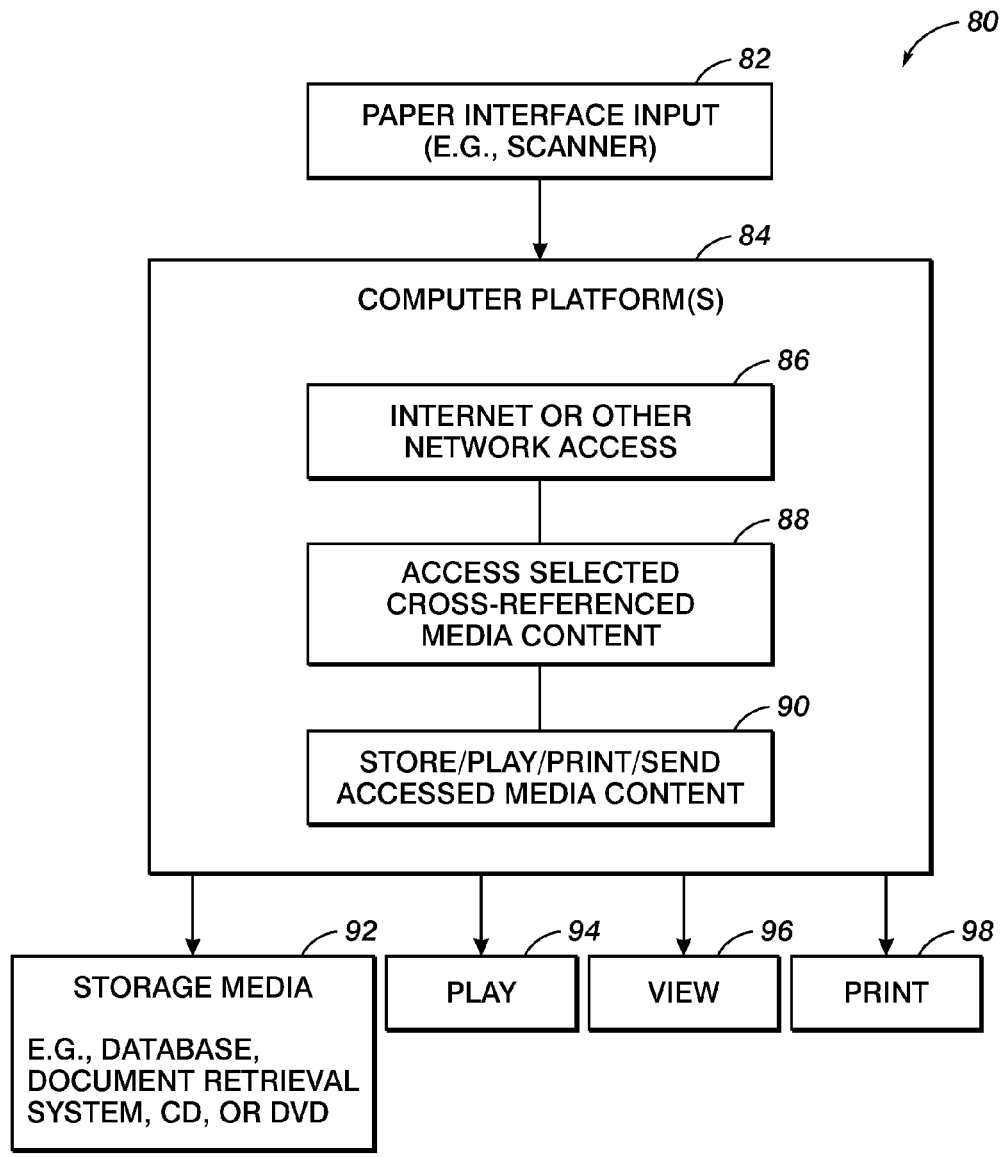
FIG. 4 is a block diagram of a paper user interface-based media content retrieval system.

FIG. 4 is a block diagram of a paper user interface-based media retrieval system 80. The illustrated system 80 includes a paper interface input 82 (e.g., a document scanner as part of a multi-function device). The paper interface input 82 is coupled to one or more computer platforms 84. The one or more computer platforms 84 include an Internet or other network access mechanism 86 coupled to access selected cross-referenced media content 88, which is in turn coupled to a store/play/print/send mechanism to cause certain actions to be performed on accessed media content 90. Those actions may include, e.g. storing, playing, printing, viewing, and/or sending retrieved selected media content. The one or more computer platforms 84 interface with storage media 92 to store media content, a play mechanism 94 to play media content, a view mechanism 96 to view media content, and a print mechanism 98 to print a hard copy of printable media content. The store mechanism 92 includes storage media. By way of example, storage media 92 may include a database, a document retrievable system, or a disk burn mechanism, such as a CD or a DVD burner.

The computer interfaces illustrated in the figures include certain graphical tools, for example, icons or otherwise manipulable graphical tools. These tools may include displayed information as well as fields for inputting information into a computer system.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example; may arise from applicants/patentees and others.

What is claimed is:

1. Apparatus comprising:
a processor;
storage holding media content including core media content having, within and not outside the core media, plural cross-reference identifiers referencing other media content not included in the core media content;
a media content presenter preconfigured to present, in a form allowing direct perception by a human, core media content selected for presentation;
a media content cross-reference scanner configured to scan the core media content selected for presentation to gather, from the core media content selected for presentation and without reference outside the core media, the plural cross-reference identifiers referencing other media content not included in the core media content selected for presentation;
a media content cross-reference presentation generator configured to generate, using the plural gathered cross-reference identifiers, a newly generated set of presentation fields that present the plural gathered cross-reference identifiers; and
a presentation controller preconfigured to cause the media content presenter to concurrently present, in a form allowing direct perception by a human, both the core media content including the plural cross-reference identifiers and, supplemental to the concurrently presented same cross-reference identifiers in the core media, the newly generated set of presentation fields, presenting the cross-reference identifiers, not already included in the presented core media content.

2. The apparatus according to claim 1, wherein the media content presenter includes a print mechanism.

3. The apparatus according to claim 2, wherein the media content presenter is a viewer to present information on a computer screen.

4. The apparatus according to claim 1, wherein the media content presenter includes a playback mechanism to play back an audio, video, or audio visual work.

5. The apparatus according to claim 1, wherein the media content presenter is provided in a computer.

6. The apparatus according to claim 1, wherein the media content includes a given digital work.

7. The apparatus according to claim 1, wherein the media content includes a document to be printed.

8. The apparatus according to claim 1, wherein the media content includes a page descriptor language (PDL) file.

9. The apparatus according to claim 1, wherein the media content includes a PostScript file.

10. The apparatus according to claim 1, wherein the media content includes a portable document format (PDF) file.

11. The apparatus according to claim 1, wherein the cross-reference identifiers include at least one of a citation in a document, a location identifier, an active link, and a uniform resource locator (URL).

12. The apparatus according to claim 1, wherein the presentation fields include printable presentation fields printable in a paper user interface.

13. The apparatus according to claim 1, wherein the presentation fields include computer screen viewable presentation fields.

14. The apparatus according to claim 1, wherein the presentation fields, when printed or viewable, include presentations of the gathered cross-reference identifiers along with retrieval request inputs to allow a user to interact with a given retrieval request input to thereby request retrieval of media content identified by the cross-referenced identifier corresponding to the given retrieval request input.

15. The apparatus according to claim 14, wherein the retrieval request inputs include checked boxes in a paper user interface.

16. The apparatus according to claim 1, wherein the presentation generator further includes a summary extraction mechanism to access data regarding given media content referred to by the cross-referenced identifiers and to extract a summary or a sample of the given media content.

17. The apparatus according to claim 16, wherein the presentation generator includes a mechanism to cause the extracted summary or sample to be printed or to be viewable via a computer screen.

18. A method comprising:
a media content presenter presenting, in a form allowing direct perception by a human, core media content selected for presentation, the core media content having, within and not outside the core media, plural cross-reference identifiers referencing other media content not included in the core media content;

scanning core media content presented by a media content presenter, without reference outside the core media, to gather, from the core media content, plural cross-reference identifiers referencing other media content not included in the core media content selected for presentation;

generating, using the plural gathered cross-reference identifiers, a newly generated set of presentation fields that present the plural gathered cross-reference identifiers; and causing the media content presenter to concurrently present, in a form allowing direct perception by a human, both the core media content including the plural cross-reference identifiers and, supplemental to the concurrently presented same cross-reference identifiers in the core media, the newly generated set of presentation fields, presenting the cross-reference identifiers, not already included in the presented core media content.

19. The method according to claim 18, wherein the media content presenter includes one of a print mechanism, a viewer, and a playback mechanism in a computer, and wherein the cross-reference identifiers include at least one of a citation in a document, a location identifier, an active link, and a uniform resource locator (URL).

20. Non-transitory computer-readable media encoded with data, the data being encoded to cause:

a media content presenter presenting, in a form allowing direct perception by a human, core media content selected for presentation, the core media content having, within and not outside the core media, plural cross-reference identifiers referencing other media content not included in the core media content;

scanning core media content presented by a media content presenter to gather, from the core media content and without reference outside the core media, plural cross-reference identifiers referencing other media content not included in the core media content selected for presentation;

generating, using the plural gathered cross-reference identifiers, a newly generated set of presentation fields presenting the plural gathered cross-reference identifiers; and causing the media content presenter to concurrently present, in a form allowing direct perception by a human, both the core media content including the plural cross-reference identifiers and, supplemental to the concurrently presented same cross-reference identifiers in the core media, the newly generated set of presentation fields not already included in the presented core media content.

21. The method according to claim 18, further comprising the media content presenter presenting the core media content by printing on paper, and also printing on paper both the presentation fields representing the gathered cross-reference identifiers and retrieval request inputs to allow a user to interact with a given retrieval request input to thereby request retrieval of media content identified by the cross-reference identifier corresponding to the given retrieval request input.

* * * * *